A. M. TOZZI.
DOWEL FOR CONDUIT SECTIONS.
APPLICATION FILED SEPT. 27, 1916.

1,296,342. Patented Mar. 4, 1919.

Inventor:
Angelo M. Tozzi
by his Attorney
John R. Nolan

UNITED STATES PATENT OFFICE.

ANGELO M. TOZZI, OF BAYONNE, NEW JERSEY.

DOWEL FOR CONDUIT-SECTIONS.

1,296,342.　　　　　Specification of Letters Patent.　　Patented Mar. 4, 1919.

Application filed September 27, 1916. Serial No. 122,345.

*To all whom it may concern:*

Be it known that I, ANGELO M. TOZZI, a subject of the King of Italy, and resident of Bayonne, in the county of Hudson and State of New Jersey, have invented certain new and useful Improvements in Dowels for Conduit-Sections, of which the following is a specification.

This invention relates to dowels for use in the installation of underground electric conduits and the like, such dowels being adapted to be entered into complementary holes therefor in the abutting ends of refractory conduit sections for the purpose of insuring the alinement of the sections.

The object of my invention is to provide a sheet metal dowel of simple and inexpensive construction combining the important elements of lightness, strength and limited flexibility.

Accordingly the invention generally stated, comprises a tubular dowel of sheet metal having between its ends a circumferential folded projection adapted to limit the insertion of either end of the dowel into the dowel-hole of a conduit section.

The invention also comprises a sheet metal tubular dowel having its ends closed and stiffened by infolded tongues integral with the body of the dowel.

The invention also comprises features of construction which will be hereinafter described and claimed.

In the drawings—

Figure 1:
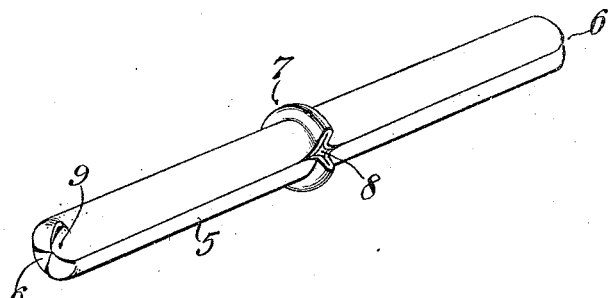
Figure 1 is a perspective view of a dowel embodying a preferred form of my invention.
Figure 2:
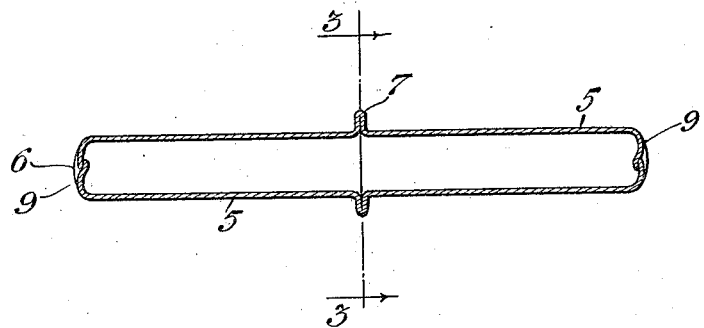
Fig. 2 is a longitudinal vertical section of the device.
Figure 3:
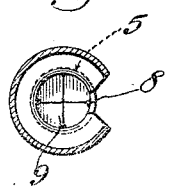
Fig. 3 is a transverse section thereof, as on the line 3—3 of Fig. 2.
Figure 4:
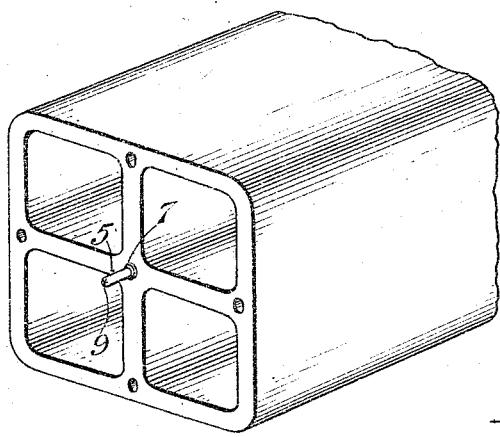
Fig. 4 is a perspective view of one end of a tile conduit section in a dowel-hole of which a dowel pin is shown as inserted preparatory to the installation of a succeeding section.

The form of dowel illustrated comprises a tubular body 5 having closed ends 6 and a substantially annular circumferentially folded projection 7 midway therebetween; the whole being composed of a single piece of sheet metal, of proper form and size, appropriately shaped by progressive stamping operations.

The projection 7 is a circumferentially folded or two-ply flange integral with the body, the adjacent ends of the flange being somewhat separated from each other to afford a space or gap between the meeting edges of the tubular body, as at 8, thus providing between the two alining members of the dowel a hinge-like connection whereby slight relative movement between the two walls of the flange can be effected when counteracting lateral pressure is applied to the respective members of the dowel.

The ends of the metal blank are serrated to form a series of projecting V-shaped tongues 9, which, when the blank is brought to tubular form, are overlapped by bending and swaging them radially inward, thus not only closing but strengthening and reinforcing the extremities of the dowel.

The dowel above described embodying my invention is simple and inexpensive in its construction and combines lightness with great strength. When the respective members of the device are entered into the corresponding dowel holes of adjoining conduit sections, and such ends are then brought hard against the intervening folded flange, perfect alinement of sections is insured.

In the event of the dowel hole of a section which is being installed being slightly out of axial alinement with the complementary hole of the just preceding section into which the dowel has been inserted, the extremity of the protruding member of the dowel, by virtue of the described yielding capacity of the flange, will be slightly deflected laterally by the impingement thereagainst of the wall of the non-alining hole of the section being installed, and hence when the latter section is forced hard up against the flange of the inserted dowel the sides of said flange will be forcibly flattened by and between the opposing faces of the two sections without any liability of fracturing the conduit section or sections or breaking the dowel.

Structural changes may be made in the device above described without departing from the principle of my invention as defined in the appended claims.

I claim—

1. A dowel of the kind described comprising a sheet metal tubular body in which the longitudinal edges of the metal are in close relation to each other, and a circumferentially folded segmental flange formed on and integral with the said body with the ends of the flange separated from each other and merging into the respective longitudinal edges of the metal, the said body providing two alining members and the said flange affording an integral yielding connection therebetween.

2. A dowel of the kind described comprising a sheet metal tubular body in which the longitudinal edges of the metal are in close relation to each other, a circumferentially folded segmental flange formed on and integral with the said body with the ends of the flange separated from each other and merging into the respective longitudinal edges of the metal, and integral overlapping tongues closing the ends of said body.

Signed at New York in the county and State of New York this 21st day of September A. D. 1916.

ANGELO M. TOZZI.

Copies of this patent may be obtained for five cents each, by addressing the "Commissioner of Patents, Washington, D. C."